US009823818B1

(12) United States Patent
Ryan et al.

(10) Patent No.: US 9,823,818 B1
(45) Date of Patent: Nov. 21, 2017

(54) SYSTEMS AND INTERACTIVE USER INTERFACES FOR AUTOMATIC GENERATION OF TEMPORAL REPRESENTATION OF DATA OBJECTS

(71) Applicant: PALANTIR TECHNOLOGIES INC., Palo Alto, CA (US)

(72) Inventors: Paul Ryan, New York City, NY (US); Sharon Hao, San Jose, CA (US); Bradley Engel, Gaithersburg, MD (US); Xinyi Wang, Ithaca, NY (US); Jack Grossman, Palo Alto, CA (US); Gregory Martin, Royal Oak, MI (US); Andrew Elder, Cherry Hills Village, CO (US); Ryan Xie, Fremont, CA (US); Brian Hamilton, Arlington, VA (US); Joshua Zavilla, Washington, DC (US); Christopher Richbourg, Arlington, VA (US); Ryan Beiermeister, Washington, DC (US); Marc Frankel, New York City, NY (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 15/092,456

(22) Filed: Apr. 6, 2016

Related U.S. Application Data

(60) Provisional application No. 62/272,526, filed on Dec. 29, 2015.

(51) Int. Cl.
*G06Q 10/06* (2012.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS

| 5,109,399 A | 4/1992 | Thompson |
| 5,329,108 A | 7/1994 | Lamoure |

(Continued)

FOREIGN PATENT DOCUMENTS

| AU | 2014250678 | 2/2016 |
| DE | 102014103482 | 9/2014 |

(Continued)

OTHER PUBLICATIONS

Timelines Everywhere 2012, Heather OCull.*
(Continued)

*Primary Examiner* — Jennifer To
*Assistant Examiner* — Beau Spratt
(74) *Attorney, Agent, or Firm* — Knobbe Martens Olson & Bear LLP

(57) ABSTRACT

Computer-implemented systems and methods are disclosed for automatically generating and displaying a chronology of events, where events may be represented by data objects in one or more databases. Events/data objects may be identified as relevant to an investigation or analysis based on specified criteria. A timeline may be generated based on the identified set of relevant events, and interactive user interfaces may be generated and displayed that present the events as a timeline and a list. Events may be selected from the timeline or the list, may be identified as key events in the chronology, and additional events related to a selected event may be deter- (Continued)

mined and added to the chronology. Timelines may be compared to other data sets, including other timelines, other event lists, and other relevant data.

20 Claims, 12 Drawing Sheets

(51) Int. Cl.
  *G06F 3/0481* (2013.01)
  *G06F 17/24* (2006.01)
  *G06F 3/0484* (2013.01)
  *G06T 11/20* (2006.01)
  *G06Q 10/10* (2012.01)

(52) U.S. Cl.
  CPC ........ *G06F 3/04845* (2013.01); *G06F 17/241* (2013.01); *G06T 11/206* (2013.01); *G06Q 10/109* (2013.01)

(56) References Cited

U.S. PATENT DOCUMENTS

| | | |
|---|---|---|
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 6,057,757 A | 5/2000 | Arrowsmith et al. |
| 6,091,956 A | 7/2000 | Hollenberg |
| 6,161,098 A | 12/2000 | Wallman |
| 6,167,405 A | 12/2000 | Rosensteel, Jr. et al. |
| 6,219,053 B1 | 4/2001 | Tachibana et al. |
| 6,232,971 B1 | 5/2001 | Haynes |
| 6,247,019 B1 | 6/2001 | Davies |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,456,997 B1 | 9/2002 | Shukla |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki |
| 6,714,936 B1 | 3/2004 | Nevin, III |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,623 B2 | 7/2013 | Jain et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |

(56) References Cited

U.S. PATENT DOCUMENTS

| | | |
|---|---|---|
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripurapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,486 B2 | 10/2014 | Tamayo |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,116,975 B2 | 8/2015 | Shankar et al. |
| 9,146,954 B1 | 9/2015 | Boe et al. |
| 9,202,249 B1 | 12/2015 | Cohen et al. |
| 9,223,773 B2 | 12/2015 | Isaacson |
| 9,229,952 B1 | 1/2016 | Meacham et al. |
| 9,250,759 B1 | 2/2016 | Commons |
| 9,256,664 B2 | 2/2016 | Chakerian et al. |
| 9,298,678 B2 | 3/2016 | Chakerian et al. |
| 9,319,288 B2 | 4/2016 | Somaiya et al. |
| 9,367,872 B1 | 6/2016 | Visbal et al. |
| 9,626,088 B2 | 4/2017 | Ma et al. |
| 9,646,396 B2 | 5/2017 | Sharma et al. |
| 2001/0021936 A1 | 9/2001 | Bertram |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman et al. |
| 2002/0116120 A1 | 8/2002 | Ruiz et al. |
| 2002/0130907 A1 | 9/2002 | Chi et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0172014 A1 | 9/2003 | Quackenbush et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0103124 A1 | 5/2004 | Kupkova |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0160309 A1 | 8/2004 | Stilp |
| 2004/0163039 A1 | 8/2004 | Gorman |
| 2004/0181554 A1 | 9/2004 | Heckerman et al. |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0125715 A1 | 6/2005 | Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0045470 A1 | 3/2006 | Poslinski et al. |
| 2006/0059139 A1 | 3/2006 | Robinson |
| 2006/0074866 A1 | 4/2006 | Chamberlain et al. |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0149596 A1 | 7/2006 | Surpin et al. |
| 2006/0184889 A1 | 8/2006 | Molander |
| 2006/0203337 A1 | 9/2006 | White |
| 2006/0209085 A1 | 9/2006 | Wong et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0150369 A1 | 6/2007 | Zivin |
| 2007/0174760 A1 | 7/2007 | Chamberlain et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0250784 A1* | 10/2007 | Riley .................... G06Q 10/10 715/764 |
| 2007/0266336 A1 | 11/2007 | Nojima et al. |
| 2007/0294200 A1 | 12/2007 | Au |
| 2007/0294643 A1 | 12/2007 | Kyle |
| 2008/0016216 A1 | 1/2008 | Worley et al. |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |

(56) References Cited

U.S. PATENT DOCUMENTS

| | | |
|---|---|---|
| 2008/0082486 A1 | 4/2008 | Lermant et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0281819 A1 | 11/2008 | Tenenbaum et al. |
| 2008/0288306 A1 | 11/2008 | MacIntyre et al. |
| 2008/0288475 A1 | 11/2008 | Kim et al. |
| 2008/0294994 A1 | 11/2008 | Kruger et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0070162 A1 | 3/2009 | Leonelli et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0150854 A1 | 6/2009 | Elaasar et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0327208 A1 | 12/2009 | Bittner et al. |
| 2010/0011282 A1 | 1/2010 | Dollard et al. |
| 2010/0030722 A1 | 2/2010 | Goodson et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0107196 A1 | 5/2011 | Foster |
| 2011/0113348 A1* | 5/2011 | Twiss .................. G06Q 10/10 715/753 |
| 2011/0117878 A1 | 5/2011 | Barash et al. |
| 2011/0119100 A1 | 5/2011 | Ruhl et al. |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0161137 A1 | 6/2011 | Ubalde et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0181598 A1 | 7/2011 | O'Neall et al. |
| 2011/0185316 A1 | 7/2011 | Reid et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowitz |
| 2011/0252351 A1* | 10/2011 | Sikora .................. G06Q 10/109 715/769 |
| 2011/0258158 A1 | 10/2011 | Resende et al. |
| 2011/0270705 A1 | 11/2011 | Parker |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0004904 A1 | 1/2012 | Shin et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0084118 A1 | 4/2012 | Bai et al. |
| 2012/0106801 A1 | 5/2012 | Jackson |
| 2012/0116828 A1 | 5/2012 | Shannon |
| 2012/0117082 A1 | 5/2012 | Koperda et al. |
| 2012/0131512 A1 | 5/2012 | Takeuchi et al. |
| 2012/0137235 A1 | 5/2012 | TS et al. |
| 2012/0144335 A1 | 6/2012 | Abeln et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |

(56) References Cited

U.S. PATENT DOCUMENTS

| | | |
|---|---|---|
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0018796 A1 | 1/2013 | Kolhatkar et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0101159 A1 | 4/2013 | Chao et al. |
| 2013/0106860 A1 | 5/2013 | De Pauw et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0166550 A1 | 6/2013 | Buchmann et al. |
| 2013/0169666 A1 | 7/2013 | Pacheco et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276000 A1* | 10/2013 | Neeman .................. G06F 9/542 |
| | | 719/318 |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0311375 A1 | 11/2013 | Priebatsch |
| 2013/0335419 A1 | 12/2013 | Bondesen et al. |
| 2014/0006938 A1* | 1/2014 | Black .................. G06T 11/206 |
| | | 715/255 |
| 2014/0019461 A1 | 1/2014 | Bredenberg et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0046934 A1 | 2/2014 | Zhou et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0059498 A1 | 2/2014 | McCormack et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0282177 A1 | 9/2014 | Wang et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2015/0019394 A1 | 1/2015 | Unser et al. |
| 2015/0046870 A1 | 2/2015 | Goldenberg et al. |
| 2015/0073929 A1 | 3/2015 | Psota et al. |
| 2015/0081370 A1 | 3/2015 | Lo et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134371 A1 | 5/2015 | Shivakumar et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178690 A1* | 6/2015 | May .................. G06Q 10/1095 |
| | | 705/7.19 |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0213631 A1 | 7/2015 | Vander Broek |
| 2015/0227295 A1 | 8/2015 | Meiklejohn et al. |
| 2015/0227847 A1 | 8/2015 | Noel et al. |
| 2015/0229532 A1 | 8/2015 | Somaiya et al. |
| 2015/0229546 A1 | 8/2015 | Somaiya et al. |
| 2015/0242401 A1 | 8/2015 | Liu |
| 2015/0254878 A1 | 9/2015 | Sharma et al. |
| 2015/0309719 A1 | 10/2015 | Ma et al. |
| 2015/0317342 A1 | 11/2015 | Grossman et al. |
| 2015/0324868 A1 | 11/2015 | Kaftan et al. |
| 2015/0341212 A1* | 11/2015 | Hsiao .................. H04L 41/0813 |
| | | 715/735 |
| 2015/0347903 A1 | 12/2015 | Saxena et al. |
| 2015/0363478 A1 | 12/2015 | Haynes |
| 2015/0378996 A1 | 12/2015 | Kesin et al. |
| 2016/0004667 A1 | 1/2016 | Chakerian et al. |
| 2016/0006749 A1 | 1/2016 | Cohen et al. |
| 2016/0034545 A1 | 2/2016 | Shankar et al. |
| 2016/0098173 A1 | 4/2016 | Slawinski et al. |
| 2016/0162497 A1 | 6/2016 | Cho et al. |
| 2017/0109030 A1 | 4/2017 | Mingione |

(56) References Cited

U.S. PATENT DOCUMENTS

2017/0109910 A1 4/2017 Sharma et al.
2017/0116294 A1 4/2017 Ma et al.

FOREIGN PATENT DOCUMENTS

| | | |
|---|---|---|
| DE | 102014215621 | 2/2015 |
| EP | 1191463 | 3/2002 |
| EP | 1672527 | 6/2006 |
| EP | 2551799 | 1/2013 |
| EP | 2560134 | 2/2013 |
| EP | 2778977 | 9/2014 |
| EP | 2778983 | 9/2014 |
| EP | 2779082 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2940603 | 11/2015 |
| EP | 2940609 | 11/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 00/09529 | 2/2000 |
| WO | WO 02/065353 | 8/2002 |
| WO | WO 2005/104736 | 11/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2010/098958 | 9/2010 |
| WO | WO 2013/010157 | 1/2013 |
| WO | WO 2013/102892 | 7/2013 |

OTHER PUBLICATIONS

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-graph.html retrieved on Aug. 18, 2015.

Bluttman et al., "Excel Formulas and Functions for Dummies," 2005, Wiley Publishing, Inc., pp. 280, 284-286.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Palantir Technolgies, "Palantir Labs—Timeline," Oct. 1, 2010, retrieved from the internet https://www.youtube.com/watch?v=JCgDW5bru9M retrieved on Aug. 19, 2015.

Palmas et al', "An Edge-Bunding Layout for Interactive Parallel Coordinates" 2014 IEEE Pacific Visualization Symposium, pp. 57-64.

Wikipedia, "Federated Database System," Sep. 7, 2013, retrieved from the internet on Jan. 27, 2015 http://en.wikipedia.org/w/index.php?title=Federated_database_system&oldid=571954221.

Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technoiogies/ retrieved on Aug. 20, 2015.

Vose et al., "Help File for ModelRisk Version 5," 2007, Vose Software, pp. 349-353. [Uploaded in 2 Parts].

Notice of Allowance for U.S. Appl. No. 13/247,987 dated Mar. 17, 2016.

Notice of Allowance for U.S. Appl. No. 14/323,935 dated Oct. 1, 2015.

Notice of Allowance for U.S. Appl. No. 14/326,738 dated Nov. 18, 2015.

Notice of Allowance for U.S. Appl. No. 14/504,103 dated May 18, 2015.

Official Communication for European Patent Application No. 14189344.6 dated Feb. 20, 2015.

Official Communication for European Patent Application No. 14189344.6 dated Feb. 29, 2016.

Official Communication for European Patent Application No. 14197879.1 dated Apr. 28, 2015.

Official Communication for European Patent Application No. 14197895.7 dated Apr. 28, 2015.

Official Communication for European Patent Application No. 14197938.5 dated Apr. 28, 2015.

Official Communication for European Patent Application No. 15165244.3 dated Aug. 27, 2015.

Official Communication for New Zealand Patent Application No. 622513 dated Apr. 3, 2014.

Official Communication for U.S. Appl. No. 13/247,987 dated Apr. 2, 2015.

Official Communication for U.S. Appl. No. 13/247,987 dated Sep. 22, 2015.

Official Communication for U.S. Appl. No. 14/306,138 dated Sep. 14, 2015.

Official Communication for U.S. Appl. No. 14/306,138 dated Mar. 17, 2016.

Official Communication for U.S. Appl. No. 14/306,138 dated Feb. 18, 2015.

Official Communication for U.S. Appl. No. 14/306,138 dated Sep. 23, 2014.

Official Communication for U.S. Appl. No. 14/306,138 dated Dec. 24, 2015.

Official Communication for U.S. Appl. No. 14/306,138 dated May 26, 2015.

Official Communication for U.S. Appl. No. 14/306,138 dated Dec. 3, 2015.

Official Communication for U.S. Appl. No. 14/306,147 dated Feb. 19, 2015.

Official Communication for U.S. Appl. No. 14/306,147 dated Dec. 24, 2015.

Official Communication for U.S. Appl. No. 14/306,147 dated Aug. 7, 2015.

Official Communication for U.S. Appl. No. 14/306,147 dated Sep. 9, 2014.

Official Communication for U.S. Appl. No. 14/306,154 dated Feb. 1, 2016.

Official Communication for U.S. Appl. No. 14/306,154 dated Mar. 11, 2015.

(56) References Cited

OTHER PUBLICATIONS

Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,765 dated Feb. 1, 2016.
Official Communication for U.S. Appl. No. 14/319,765 dated Sep. 10, 2015.
Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/645,304 dated Jan. 25, 2016.
Official Communication for U.S. Appl. No. 14/874,690 dated Jun. 1, 2016.
Official Communication for U.S. Appl. No. 14/874,690 dated Dec. 21, 2015.
Official Communication for U.S. Appl. No. 14/948,009 dated Feb. 25, 2016.
"A First Look: Predicting Market Demand for Food Retail using a Huff Analysis," TRF Policy Solutions, Jul. 2012, pp. 30.
"A Quick Guide to UniProtKB Swiss-Prot & TrEMBL," Sep. 2011, pp. 2.
"A Word About Banks and the Laundering of Drug Money," Aug. 18, 2012, http://www.golemxiv.co.uk/2012/08/a-word-about-banks-and-the-laundering-of-drug-money/.
"Money Laundering Risks and E-Gaming: A European Overview and Assessment," 2009, http://www.cf.ac.uk/socsi/resources/Levi_Final_Money_Laundering_Risks_egaming.pdf.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"The FASTA Program Package," fasta-36.3.4, Mar. 25, 2011, pp. 29.
"Using Whois Based Geolocation and Google Maps API for Support Cybercrime Investigations," http://wseas.us/e-library/conferences/2013/Dubrovnik/TELECIRC/TELECIRC-32.pdf.
Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.
Alur et al., "Chapter 2: IBM InfoSphere DataStage Stages," IBM InfoSphere DataStage Data Flow and Job Design, Jul. 1, 2008, pp. 35-137.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726 —[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, pp. 15.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public _Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al., "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Jelen, Bill, "Excel 2013 in Depth, Video Enhanced Edition," Jan. 25, 2013.

(56) References Cited

OTHER PUBLICATIONS

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Kitts, Paul, "Chapter 14: Genome Assembly and Annotation Process," The NCBI Handbook, Oct. 2002, pp. 1-21.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," http://www.mozilla.org/editor/ui_specs/FileSaveDialogs.html, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.
Microsoft Office—Visio, "About connecting shapes," http://office.microsoft.com/en-us/visio-help/about-connecting-shapes-HP085050369.aspx printed Aug. 4, 2011 in 6 pages.
Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.
Mizrachi, Ilene, "Chapter 1: GenBank: The Nuckeotide Sequence Database," The NCBI Handbook, Oct. 2002, pp. 1-14.
Nierman, "Evaluating Structural Similarity in XML Documents", 6 pages, 2002.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Perdisci et al., "Behavioral Clustering of HTTP-Based Malware and Signature Generation Using Malicious Network Traces," USENIX, Mar. 18, 2010, pp. 1-14.
Psaltis, Andrew G., "Streaming Data—Designing the Real-Time Pipeline," MEAP began Jul. 2014, Part 1, pp. 15.
Quest, "Toad for ORACLE 11.6—Guide to Using Toad," Sep. 24, 2012, pp. 1-162.
Rouse, Margaret, "OLAP Cube," http://searchdatamanagement.techtarget.com/definition/OLAP-cube, Apr. 28, 2012, pp. 16.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Symantec Corporation, "E-Security Begins with Sound Security Policies," Announcement Symantec, Jun. 14, 2001.
Thompson, Mick, "Getting Started with GEO," Getting Started with GEO, Jul. 26, 2011.
Umagandhi et al., "Search Query Recommendations Using Hybrid User Profile with Query Logs," International Journal of Computer Applications, vol. 80, No. 10, Oct. 1, 2013, pp. 7-18.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Yang et al., "HTML Page Analysis Based on Visual Cues", A129, pp. 859-864, 2001.
International Search Report and Written Opinion in Application No. PCT/US2009/056703, dated Mar. 15, 2010.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/320,236 dated Jun. 29, 2016.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/596,552 dated Dec. 23, 2016.
Notice of Allowance for U.S. Appl. No. 14/616,080 dated Apr. 2, 2015.
Notice of Allowance for U.S. Appl. No. 14/923,364 dated May 6, 2016.
Notice of Allowance for U.S. Appl. No. 14/948,009 dated May 6, 2016.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.
Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.

(56) References Cited

OTHER PUBLICATIONS

Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14199182.8 dated Mar. 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15166137.8 dated Sep. 14, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15183721.8 dated Nov. 23, 2015.
Official Communication for European Patent Application No. 16152984.7 dated Mar. 24, 2016.
Official Communication for Great Britain Patent Application No. 1404457.2 dated Aug. 14, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012437 dated Sep. 18, 2015.
Official Communication for Netherlands Patent Application No. 2013306 dated Apr. 24, 2015.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated May 5, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated May 20, 2015.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/268,964 dated Jul. 11, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated Jul. 22, 2014.

(56) References Cited

OTHER PUBLICATIONS

Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,147 dated Jun. 3, 2016.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/570,914 dated Sep. 16, 2016.
Official Communication for U.S. Appl. No. 14/570,914 dated Dec. 19, 2016.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/596,552 dated Dec. 23, 2016.
Official Communication for U.S. Appl. No. 14/596,552 dated Sep. 23, 2016.
Official Communication for U.S. Appl. No. 14/596,552 dated Oct. 5, 2016.
Official Communication for U.S. Appl. No. 14/631,633 dated Sep. 10, 2015.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/726,353 dated Sep. 10, 2015.
Official Communication for U.S. Appl. No. 14/813,749 dated Sep. 28, 2015.
Restriction Requirement for U.S. Appl. No. 13/839,026 dated Apr. 2, 2015.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Notice of Allowance for U.S. Appl. No. 14/570,914 dated Jan. 31, 2017.
Official Communication for U.S. Appl. No. 14/135,289 dated Oct. 14, 2014.
Official Communication for U.S. Appl. No. 14/148,559 dated Jun. 16, 2014.
Official Communication for U.S. Appl. No. 14/148,559 dated Apr. 2, 2014.
Official Communication for U.S. Appl. No. 15/392,624 dated Mar. 10, 2017.
Official Communication for U.S. Appl. No. 15/397,562 dated Mar. 14, 2017.

* cited by examiner

*500f*

| | | | | |
|---|---|---|---|---|
| *504* | | | | |

Acme, Inc. Insider Trading Chronology – Timeline List

July 2015
```
          1  2  3  4
 5  6  7  8  9 10 11
12 13 14 15 16 17 18
19 21 22 23 24
26 27 ($) 29 30 31
```

August 2015
```
                   1
 2  3  4  5 (☎) 7  8
 9 10 11 12 13 14 15
```

*502*

| *554* Type | *556* Date Range | *558* Title | *560* Participants |
|---|---|---|---|
| Email | Jul 20, 2015 Mon, 03:56 PM | New information | WC -> DD |
| Phone Call | Jul 25, 2015 Fri, 10:02 AM – 10:20 AM | | WC -> DD |
| Stock Trade | Jul 28, 2015 Mon, 09:45 AM | | WC |
| Phone Call | Aug 6, 2015 | | DD -> WC |

SYSTEMS AND INTERACTIVE USER INTERFACES FOR AUTOMATIC GENERATION OF TEMPORAL REPRESENTATION OF DATA OBJECTS

CROSS-REFERENCE TO RELATED APPLICATION

This application is a non-provisional of and claims priority to U.S. Provisional Application No. 62/272,526, which is hereby incorporated by reference in its entirety.

TECHNICAL FIELD

The present disclosure relates to systems and techniques for data integration, analysis, and visualization. More specifically, the present disclosure relates to systems and techniques for integrating, analyzing, and visualizing data through the automatic generation of a chronology user interface.

BACKGROUND

Electronic record-keeping produces data sets with thousands or millions of records. The sheer quantity of information available for analysis may prevent meaningful conclusions from being drawn, or may prevent connections between events from even being discovered. Filtering data based on relationships, events, and common characteristics and visually presenting the data in concise and informative ways can help users to identify data relevant to a particular time, place, or sequence of events.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to automatic generation of interactive user interfaces for presentation of chronologies. A chronology user interface may be utilized to identify a set of relevant events. The events may be identified according to specified criteria, by comparing events and determining common attributes, or may be identified based on inputs, as described below. An interactive user interface may then be generated that displays the events, for example, as a timeline and a list. The timeline and list may be interactive. For example, an event on the timeline may be selected based on user input, and additional information or related events may be displayed. Modifiable attributes of events, such as annotations or associated keywords, may be modified via the user interface.

Chronology user interfaces may be used to compare timelines and to present and analyze various theories regarding a set of events and the relationship between them.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

In an embodiment, a computer system is disclosed comprising a data store configured to store computer executable instructions, and a processor that, when executing the computer-executable instructions, is configured to: obtain a plurality of events, each of the plurality of events comprising a respective set of event attributes, the event attributes comprising at least an event timestamp; obtain one or more criteria associated with event attributes; determine, based at least in part on the one or more criteria, a set of relevant events within the plurality of events; generate for display a user interface based at least in part on the set of relevant events and the corresponding event attributes, the user interface comprising (1) a timeline interface for display of a timeline, wherein positions of individual relevant events within the timeline interface are determined based at least in part on respective event timestamps, and (2) a list interface for display of the relevant events; and cause display of the user interface.

In some embodiments, the event attributes further comprise at least one of an event source, an event type, an event icon, an event duration, an event title, a set of event participants, a set of event keywords, and a set of event annotations.

In some embodiments, the processor is further configured to: obtain input identifying a selected event displayed within the user interface; generate for display a first update to the user interface, the first update comprising (1) an indication of selection of the selected event within the timeline interface, and (2) an indication of selection of the selected event within the list interface; and cause display of the first update to the user interface.

In some embodiments, the processor is further configured to: determine that at least one of the plurality of events has been updated; generate an alert indicating that the at least one of the plurality of events has been updated; and cause transmission of the alert to a computing device, wherein transmission of the alert causes the computing device to activate an application for display of the alert, and wherein the alert enables display of an updated user interface, the updated user interface based at least in part on an updated event of the plurality of events.

In some embodiments, the processor is further configured to: determine, based at least in part on the selected event, one or more related events from within the plurality of events; generate for display an event selection interface for display of the one or more related events; and cause display of the event selection interface.

In some embodiments, the processor configured to determine the one or more related events is configured to determine the one or more related events based at least in part on one or more attributes of the selected event.

In some embodiments, the processor is further configured to obtain input identifying a related event within the one or more related events; generate for display a second update to the user interface, the second update comprising (1) display of the related event within the timeline interface and (2) display of the related event within the list interface; and cause display of the second update to the user interface.

In another embodiment, a computer-implemented method is disclosed comprising obtaining a plurality of events, each of the plurality of events comprising event attributes; determining, based at least in part on one or more criteria associated with event attributes, a set of relevant events within the plurality of events; generating for display a user interface based at least in part on the set of relevant events, the user interface comprising (1) a timeline interface for display of a timeline, wherein positions of individual relevant events within the timeline interface are determined based at least in part on respective event attributes, and (2) a list interface for display of the set of relevant events; and displaying the user interface.

In some embodiments, the timeline interface displays a subset of the set of relevant events as key events. In some embodiments, the event attributes include at least one configurable attribute, and in some embodiments the at least one configurable attribute comprises an event annotation, an event icon, an event description, or an event keyword.

In some embodiments, the computer-implemented method further comprises obtaining an input indicative of a modification of a configurable attribute for a relevant event; modifying the configurable attribute for the relevant event; generating for display a first update to the user interface, the first update comprising at least one of a modified configurable attribute within the timeline interface and a modified configurable attribute within the list interface; and causing display of the first update to the user interface.

In some embodiments, the computer-implemented method further comprises obtaining one or more updates to the plurality of events; determining, based at least in part on the one or more updates, an update to the set of relevant events; generating for display an alert message, the alert message indicating the update to the set of relevant alerts; and displaying the alert message.

In some embodiments, determining the update to the set of relevant events comprises at least one of determining an additional event to include in the set of relevant events, determining an event to remove from the set of relevant events, or determining a changed event attribute for an event in the set of relevant events.

In some embodiments, the computer-implemented method further comprises generating for display an updated user interface based at least in part on the update to the set of relevant events, the updated user interface comprising an updated timeline interface and an updated list interface; and displaying the updated user interface.

In another embodiment, a non-transitory computer-readable storage medium is disclosed, the non-transitory computer-readable storage medium including computer-executable instructions that, when executed by a processor, cause the processor to: determine, based at least in part on a first set of criteria, a first set of relevant events within a plurality of events; generate a first timeline corresponding to the first set of relevant events; generate for display a first user interface based at least in part on the first set of relevant events, the first user interface comprising (1) a timeline interface for display of at least a portion of the first timeline, wherein individual relevant events are positioned within the timeline interface based at least in part on respective attributes of the individual relevant events, and (2) a list interface for display of at least the portion of the first set of relevant events; and cause display of the first user interface.

In some embodiments, the computer-executable instructions further cause the processor to obtain the plurality of events. In some embodiments, the first set of criteria comprise one or more inputs, and each of the one or more inputs are indicative of a selection of a respective event. In some embodiments, the first set of criteria is associated with event attributes, and the first set of relevant events comprises events that satisfy the first set of criteria.

In some embodiments, the computer-executable instructions further cause the processor to determine, based at least in part on a second set of criteria, a second set of relevant events within the plurality of events; generate a second timeline corresponding to the second set of events; generate for display a second user interface based at least in part on the second set of relevant events; and cause display of the second user interface.

In some embodiments, the first set of relevant events and the second set of relevant events have at least one event in common. In some embodiments, the second user interface comprises a combined timeline interface for display of a combined timeline, the combined timeline comprising the first timeline and at least a portion of the second timeline; a first list interface for display of the first set of relevant events; and a second list interface for display the second set of relevant events. In some embodiments, the computer-executable instructions further cause the processor to generate the combined timeline based at least in part on the first timeline and the second timeline.

BRIEF DESCRIPTION OF THE DRAWINGS

Reference will now be made to the accompanying drawings, which illustrate exemplary embodiments of the present disclosure. In the drawings:

FIGS. 5A-5F are block diagrams of example user interfaces for presenting and interacting with chronologies in accordance with aspects of the present disclosure;

DETAILED DESCRIPTION

Figure 1:
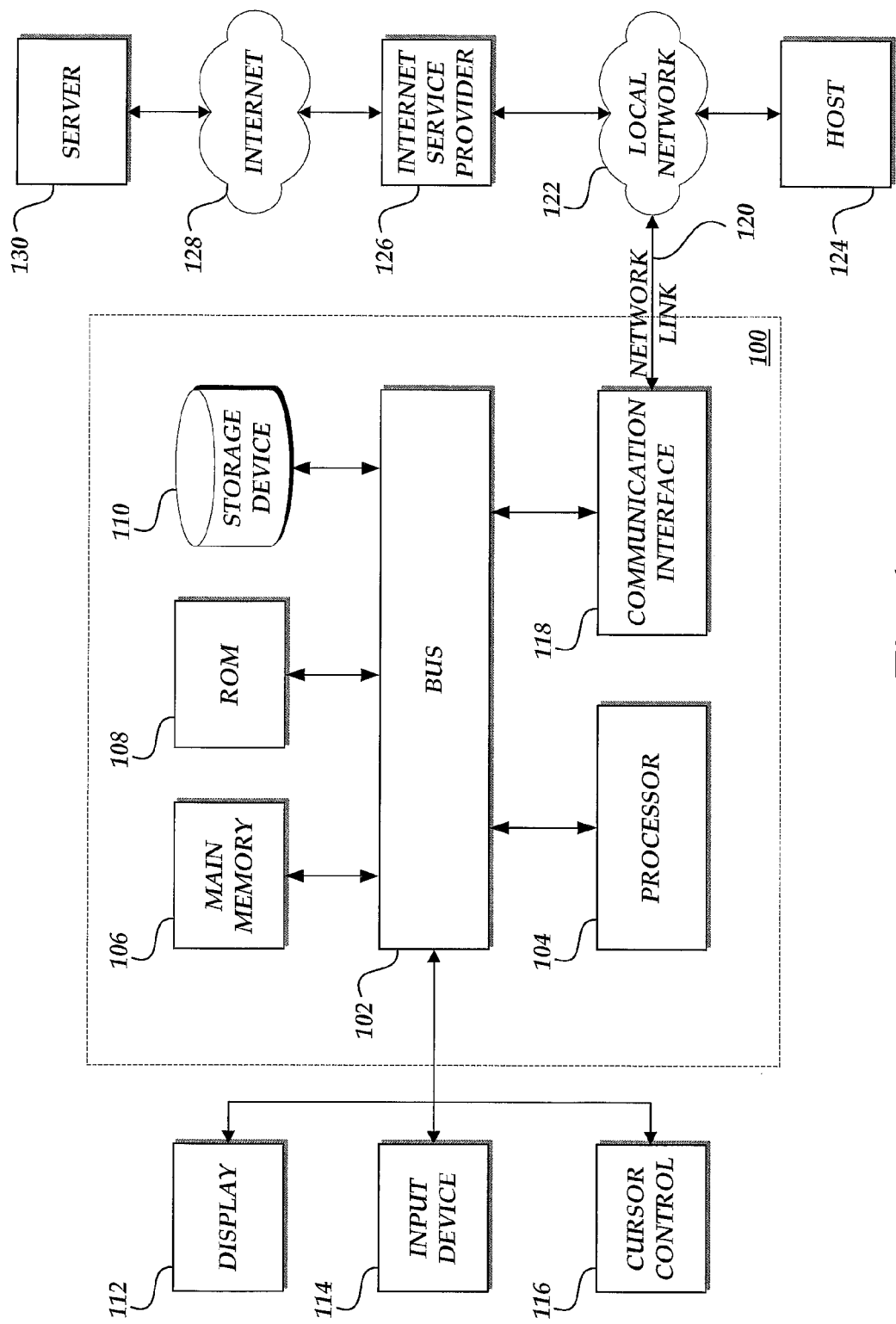
FIG. 1 is a block diagram of an example computer system consistent with embodiments of the present disclosure.

Reference will now be made in detail to example embodiments, the examples of which are illustrated in the accompanying drawings. Whenever possible, the same reference numbers will be used throughout the drawings to refer to the same or like parts.

Embodiments of the present disclosure relate to systems, methods, and computer-readable mediums for automatically generating and displaying a chronology. A chronology system obtains criteria for identifying a set of relevant events, and automatically generates for display an interactive user interface. The system processes input to designate key events, identify related events, and specify annotations or other modifiable attributes. Chronologies may be compared to each other, or to other data sets, to facilitate analysis and investigation.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

In various embodiments of the present disclosure, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. Additionally, various embodiments of the present disclosure are inextricably tied to computer technology. In particular, various embodiments rely on detection of user inputs via graphical user interfaces, calculation of updates to displayed electronic data based on those user inputs, automatic processing of related events, and presentation of the updates to displayed chronologies via interactive graphical user interfaces. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values. May also be referred to herein as "attributes."

Property Type: The type of data a property is, such as a string, an integer, or a double. Property types may include complex property types, such as a series data values associated with timed ticks (e.g. a time series), etc. May also be referred to herein as "attribute types."

Property Value: The value associated with a property, which is of the type indicated in the property type associated with the property. A property may have multiple values. May also be referred to herein as "attribute values."

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Example Devices/Systems

By way of example, FIG. 1 is a block diagram that illustrates an implementation of an electronic device 100, which, as described above, can comprise one or more electronic devices. Electronic device 100 includes a bus 102 or other communication mechanism for communicating information, and one or more hardware processors 104, coupled with bus 102 for processing information. One or more hardware processors 104 can be, for example, one or more microprocessors.

Electronic device 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 100 into a special-purpose machine that is customized to perform the operations specified in the instructions.

Electronic device 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Electronic device 100 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 100 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Ruby. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 100 can implement the techniques and other features described herein using customized hard-wired logic, one or more ASICs or FPGAs, firmware and/or program logic which in combination with the electronic device causes or programs electronic device 100 to be a special-purpose machine. According to some embodiments, the techniques and other features described herein are performed by electronic device 100 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 110. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio wave and infrared data communications.

Various forms of media can be involved in carrying one or more sequences of one or more instructions to processor 104 for execution. For example, the instructions can initially be carried on a magnetic disk or solid-state drive of a remote computer. The remote computer can load the instructions into its dynamic memory and send the instructions over a telephone line using a modem. A modem local to electronic device 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 100 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic, or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic, or optical signals that carry digital data streams. The signals through the various networks and the signals on network link 120 and through communication interface 118, which carry the digital data to and from electronic device 100, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122, and communication interface 118. The received code can be executed by processor 104 as it is received, and/or stored in storage device 150 or other non-volatile storage for later execution. In some embodiments, server 130 can provide information for being displayed on a display, such as display 112.

Example Data Model

Figure 2:
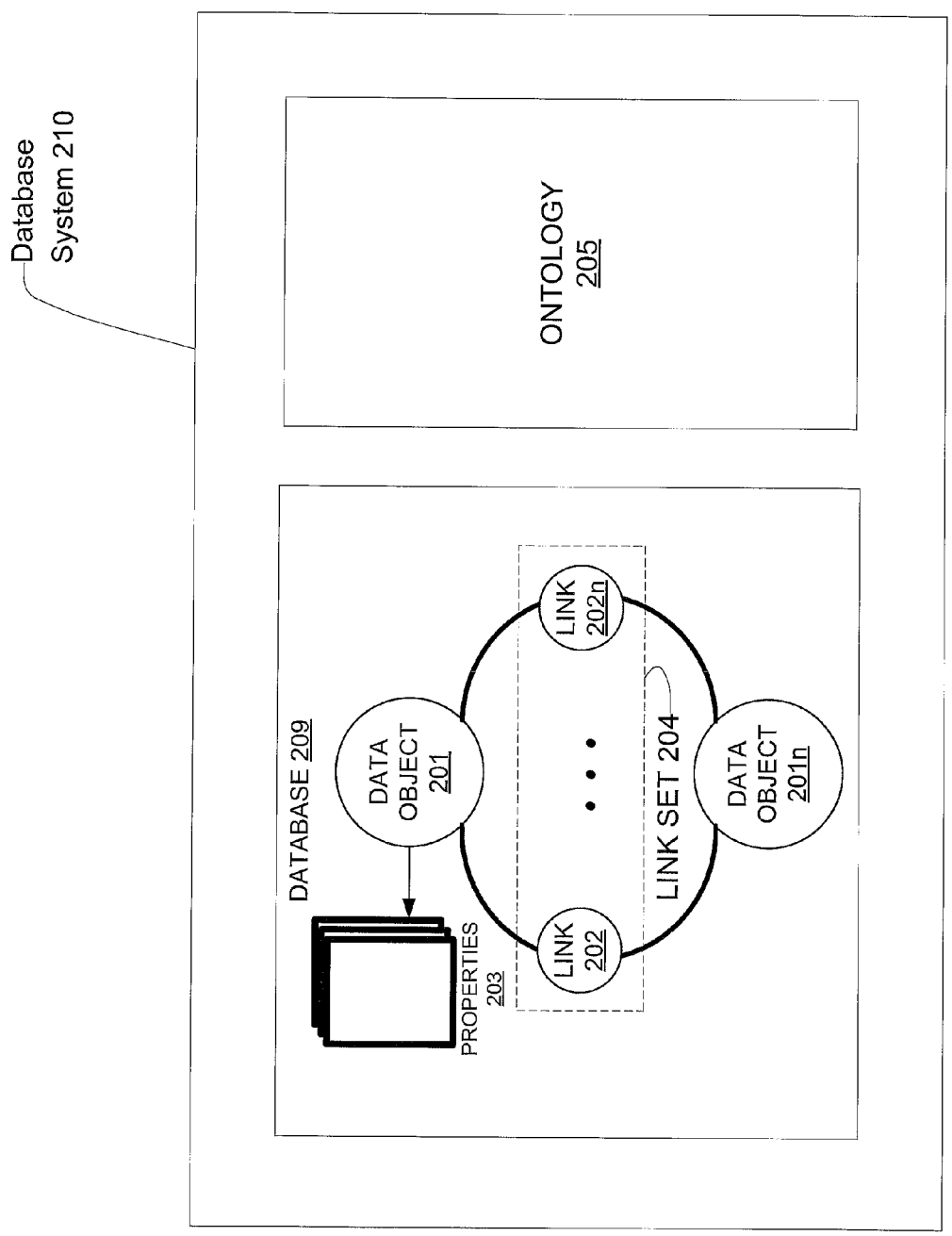
FIG. 2 illustrates one embodiment of a database system using an ontology.

With reference now to FIG. 2, and to provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
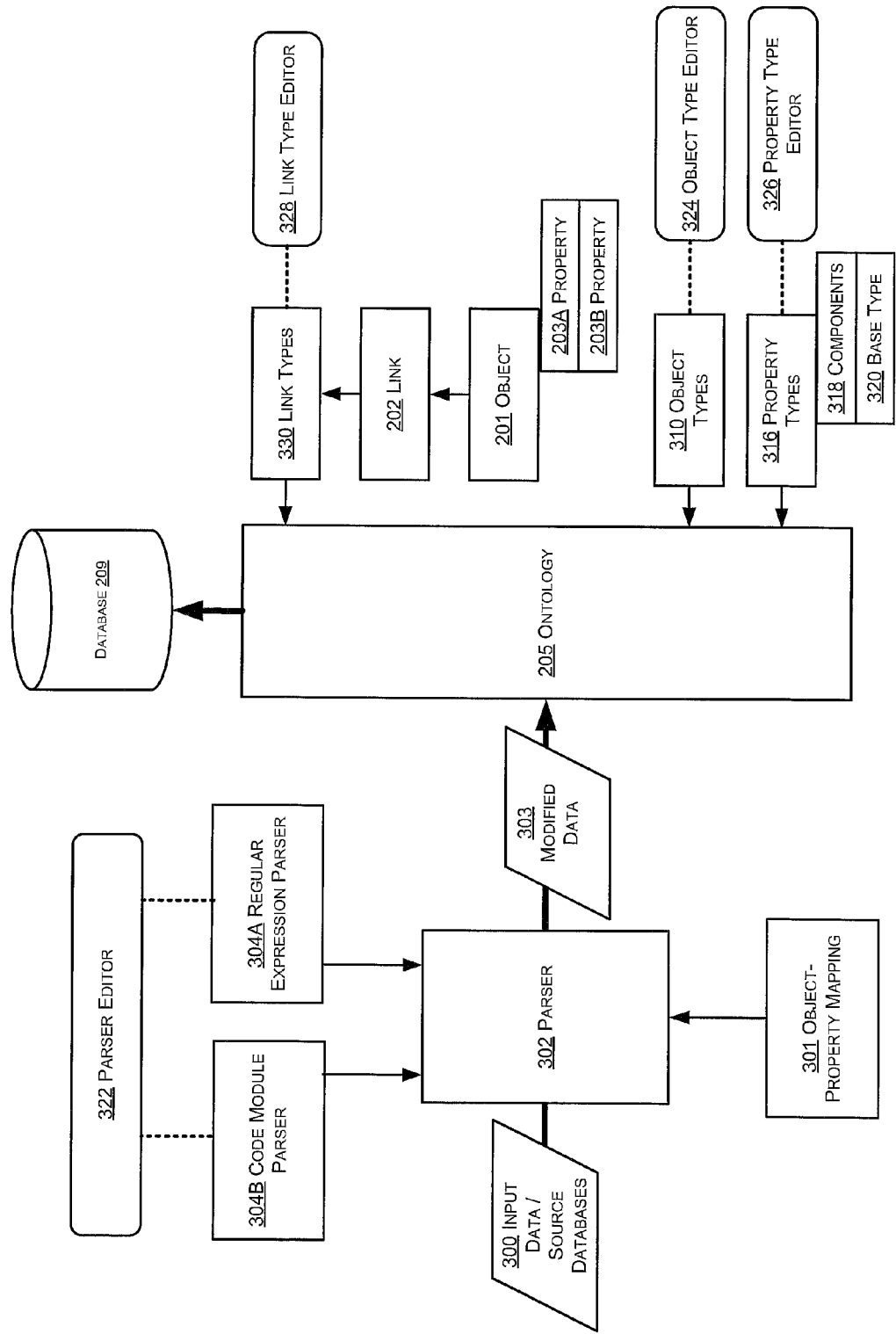
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

In an embodiment, the sources of input data 300 may themselves be stored or made available. For example, a user may provide a source document containing input data 300 that is processed by parser 302 as described above. The source document may be stored in the database 209 and associated with data objects 201 that are instantiated when parsing the source document. The source document may be made available when accessing data objects 201 associated with it, e.g., via the graphical user interface described below. In another embodiment, a user may provide a reference to a source document, such as a uniform resource locator (URL) or an Application Programming Interface (API) call that provides access to the source document. The reference may be utilized by the parser 302 to access and parse the source document, and may be associated with data objects 201 that are instantiated when parsing the source document. In still another embodiment, an API may be provided that allows sources of input data 300 to provide their data in a specified format.

The properties, objects, and links (e.g. relationships) between the objects can be visualized using a graphical user interface (GUI). For example, FIG. 4 displays a user interface showing a graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. In this embodiment, the data objects include person objects 421, 422, 423, 424, 425, and 426; a flight object 427; a financial account 428; and a computer object 429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 4:
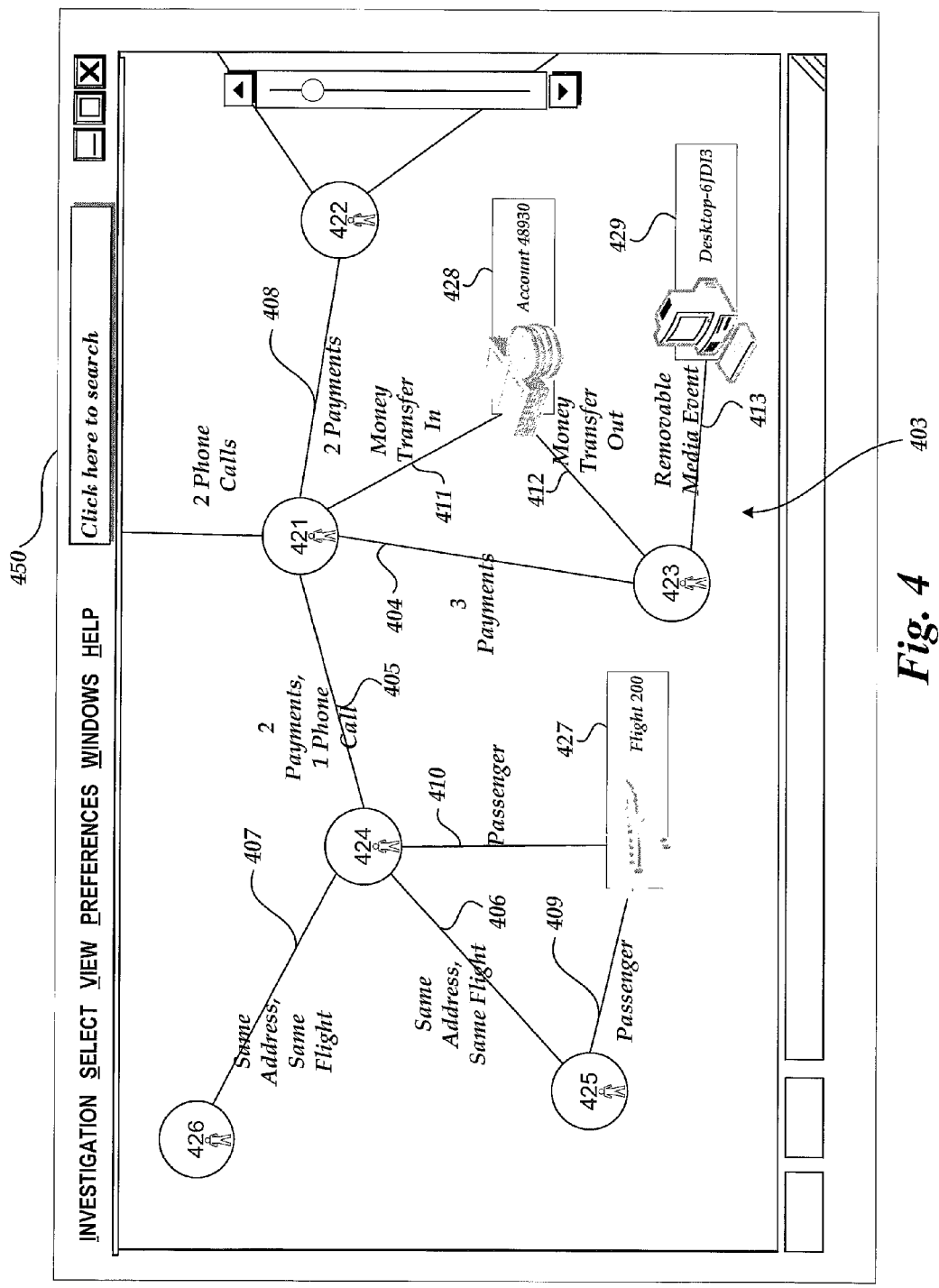
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. As a further example, the objects within database 108 may be associated with source documents, as described above, and the source documents may be inspected or exported when viewing associated objects. In some embodiments, selecting a source document for inspection may cause display of a separate user interface (e.g., in a separate window, document viewer, browser, or other application).

Example User Interfaces

With reference now to FIGS. 5A-5F, examples of user interfaces 500*a-f* for presentation of chronology information will be described. FIGS. 5A-5F depict simplified interfaces for purposes of illustration, and user interfaces 500*a-f* may have more or fewer components within the scope of the present disclosure. As non-limiting examples, user interfaces 500 may be implemented as a web page displayed via a web browser, or as an application executing on a tablet, mobile, or other computing device, such as the electronic device 110 and display 112 of FIG. 1.

Figure 5A:
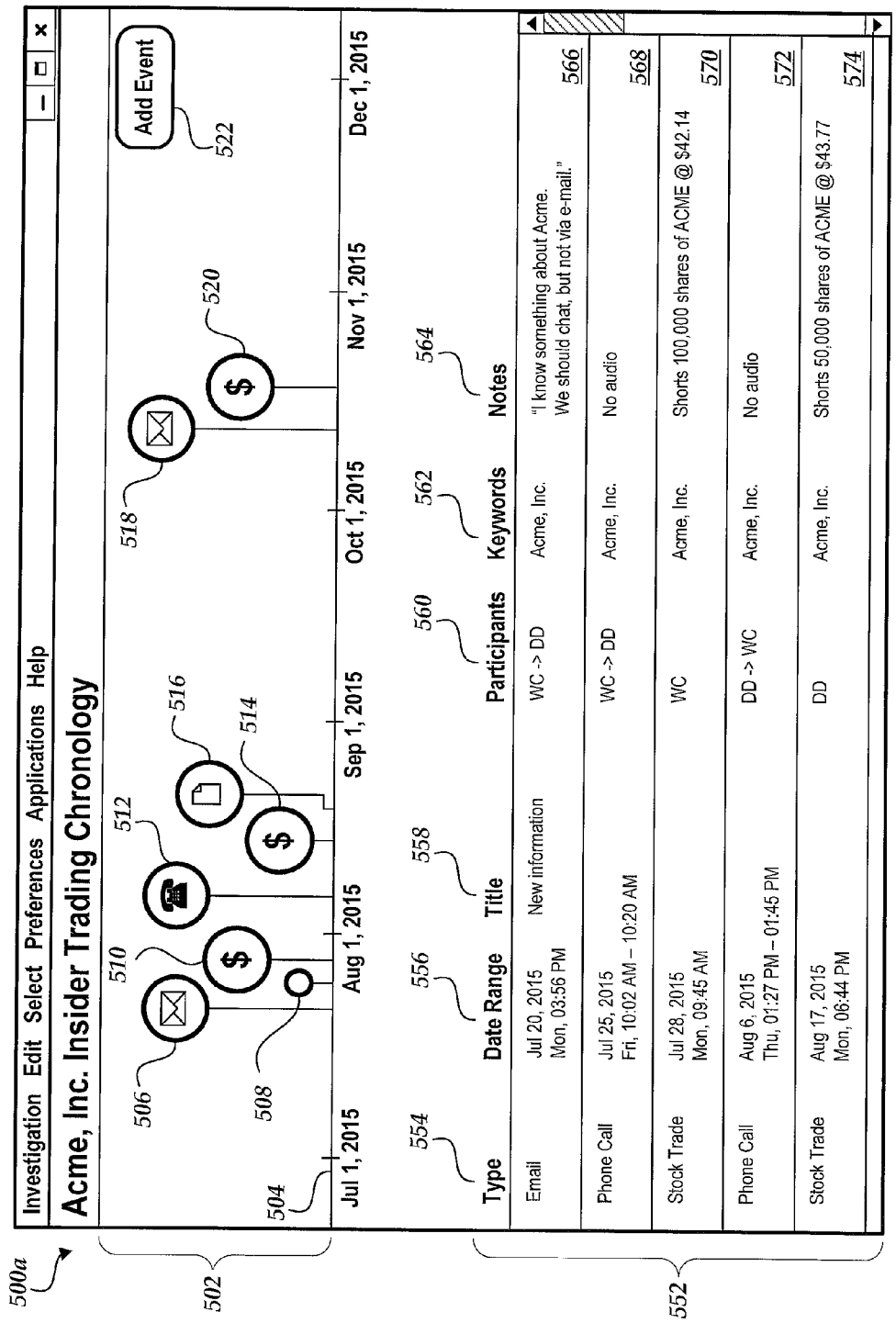

Turning now to FIG. 5A, the illustrated user interface 500*a* includes a timeline interface 502. The timeline interface 502 includes timeline 504, which displays event icons 506-520 in chronological order. In some embodiments timeline 504 may be interactive, such that inputs received from a touchscreen or input device cause the timeline to scroll, zoom, or change the amount of detail displayed with regard to the event icons 506-520.

Event icons 506-520 correspond to a set of events (e.g., representing data objects of the type "event" and/or representing relationships among data objects, as described above) that are relevant to an investigation or analysis. In some embodiments, some or all of the relevant events may be obtained or determined based on criteria, such as events associated with a particular source, activity, participant, or other attribute. In other embodiments, the events displayed in the timeline interface 502 may be identified via inputs received from a touchscreen or input device. For example, input indicating that button 522 has been tapped or clicked may cause display of a separate interface for adding an event to the timeline. In further embodiments, timeline interface 502 or list interface 552 may be responsive to drag-and-drop input, such that dragging and dropping an event onto the timeline interface 502 or list interface 552 causes the event to be added to the set of relevant events and an additional event icon to be added to the timeline 504. For example, in some embodiments data objects may be dragged from one user interface (such as a user interface similar to the user interface of FIG. 4) to another user interface (such as the user interface of FIG. 5A) to add an event corresponding to the dragged data object to the set of events.

In the illustrated example, the events for which icons 506-520 are displayed relate to insider trading. Such events may be identified, for example, based on keyword criteria (e.g., a common company or stock symbol) or participant criteria (e.g., participants WC and DD) within a relevant timeframe. Although insider trading events are depicted for purposes of example, the present disclosure is not limited to a particular type of investigation or analysis. As non-limiting examples, a chronology user interface may be used to analyze and present events related to law enforcement (criminal investigations, prosecutions, defenses, anti-money laundering investigations, investigations into events leading up to use of a weapon (e.g., by a law enforcement officer), etc.), cybersecurity, finance (stock portfolios, loans, etc.), health issues (treatment plans, clinical drug trials, disease vectors, etc.), public safety, product marketing, anti-bribery workflows, cyber fraud detection, cyber breach detection, triage and analysis, investigations into consumer churn and retention (e.g., macro analysis (e.g., all customers), micro analysis (e.g., customer specific), analysis of events/trends that lead to a customer (or group) adopting or leaving products, buying more products, etc.), and/or other events that may be presented and analyzed chronologically.

Events 506-520 may correspond to various event categories or types, and may be displayed in the timeline interface 502 accordingly. As a non-limiting example, event 506 may correspond to transmission or receipt of an email message, and may accordingly be presented in the timeline interface 502 with a "mail" symbol or other designation. As further non-limiting examples, events 512, 514, and 520 may correspond to financial transactions (e.g., stock trades) occurring at the indicated times, events 508 and 512 may correspond to telephone calls, and event 516 may correspond to a document (e.g., an earnings report or press release) that was issued on the date and time indicated by the line connecting event 516 to the timeline 504. In various embodiments, some or all of events 506-520 may be labeled according to an event category, participant, source, keyword, annotation, or other attribute. In some embodiments, event labels or icons may be selected in response to input. For example, input may be received indicating that event participants should be displayed as icons. Although a particular embodiment is illustrated in FIGS. 5A-5D, one skilled in the art will understand that aspects of the present disclosure include various labels and representations. For example, event icons may be displayed in color, with the icon indicating the event type and the colors indicating participants, such that a blue "dollar sign" symbol indicates a stock trade performed by participant WC, and a blue-green "telephone" symbol indicates a phone call between participants WC and DD.

In FIG. 5A, event 508 is displayed in a minimized format that does not include an event icon. Illustratively, timeline interface 502 may display events in a minimized format to conserve space. In some embodiments, certain events in the timeline may be identified as key events, and the timeline interface 502 may display only the key events in the larger format. Key events may be identified, for example, according to specified criteria, via inputs obtained via the user interface 500, or combinations thereof. In further embodiments, a number of minimized formats may be utilized, and a particular minimized format may be selected based on, for example, the number of events on the timeline 504, the scope of the timeline 504, the size of the display, or other factors.

In some embodiments, the appearance or format of event icons 506-520 may be modified or customized. For example, events may be color-coded according to event type, participants, source, or other criteria. Event icons 506-520 may further be customized to display different icon shapes or symbols, or to display annotations or other attributes associated with some or all of the events.

The illustrated user interface 500a further includes a list interface 552. The list interface 552 displays the set of relevant events 506-520 in a list format. In the depicted embodiment, non-limiting examples of various event attributes are displayed in columns 554-564. For example, column 554 contains an event type or category, such as an email message, phone call, or stock trade. The event categories displayed in column 554 may correspond to event icons displayed in the timeline interface 502. As a further example, column 556 contains a date or date range associated with the event, which may correspond to the position of events in the timeline interface 502. The timeline interface 502 may not display corresponding information for all columns in the list interface 552. In FIG. 5A, the title column 558, participant column 560, keywords column 562, and notes column 564 are examples of event attributes that may not be displayed in the timeline interface. In some embodiments, columns of the list interface 552 may be selectable, and selection of a column may cause the selected attribute to be displayed or highlighted in the timeline interface 502.

The list interface 552 further includes event rows 566-574, which correspond to event icons 506-514 in the timeline interface 502. The list interface 552 may be scrollable, and input to the list interface 552 may cause, for example, rows corresponding to event icons 516-520 to scroll into view. In some embodiments, the list interface 552 may enable input or modification of event attributes that are modifiable, such as keywords, notes, or other attributes associated with the event. Other attributes, such as the date and participants in a phone call or other events, may not be modifiable.

Figure 5B:
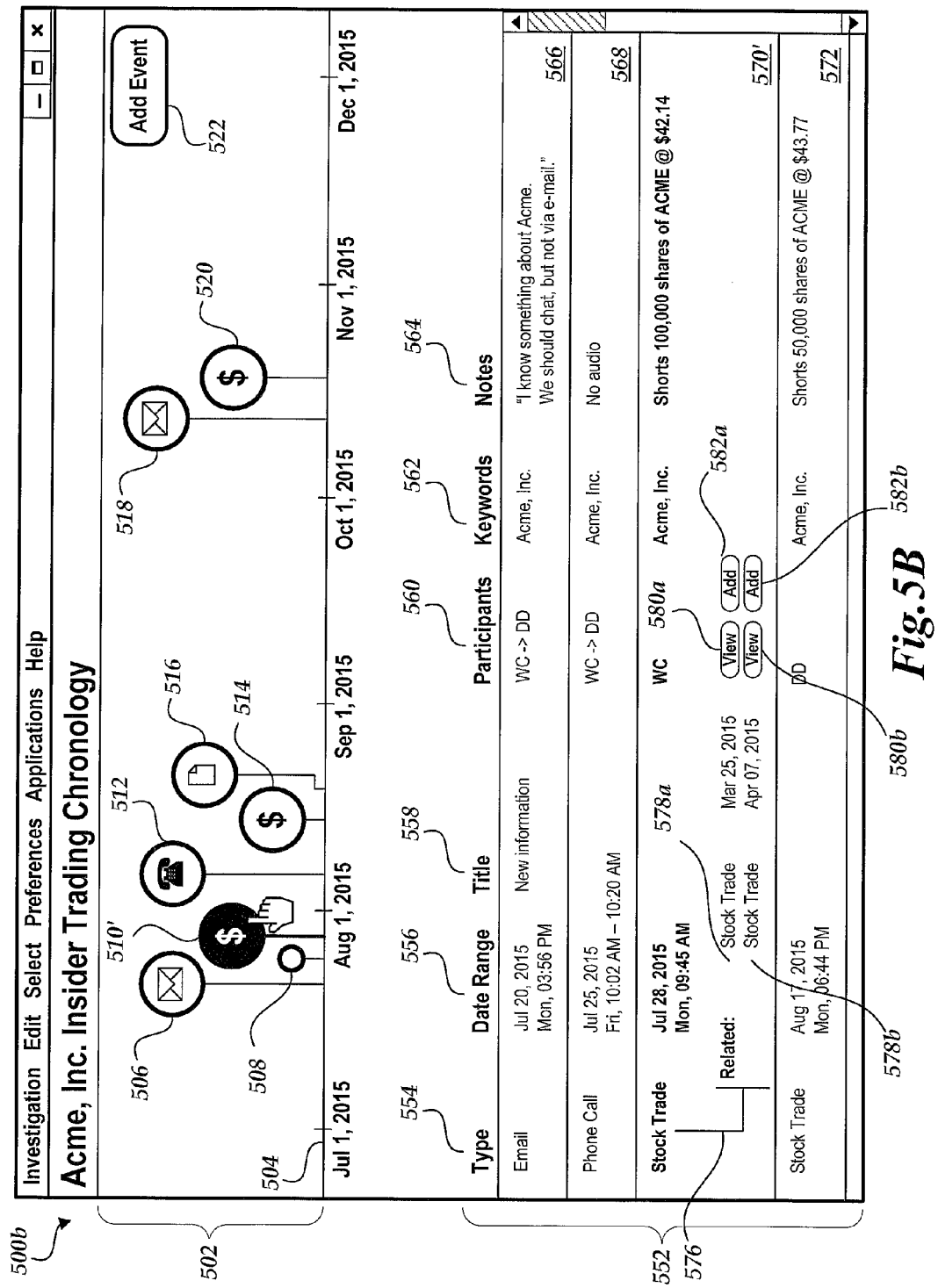

With reference now to FIG. 5B, an example interface 500b for selecting displayed events and adding related events to the chronology will be described. Interface 500b may be displayed, for example, as a modification or update to interface 500a. Accordingly, only the elements of interface 500b that differ relative to interface 500a will be described.

In FIG. 5B, the timeline interface 502 has obtained a selection input. The selection input is illustrated as a hand cursor in the depicted embodiment, and indicates selection of the event associated with event icon 510 of FIG. 5A. The timeline interface 502 of FIG. 5B has accordingly updated to display event icon 510', highlighting the selection. Because row 570 of the list interface 552 of FIG. 5A also corresponds to the selected event, the list interface 552 has updated to include row 570', which highlights the selected event in the list. In some embodiments, events associated with audio or video, such as the telephone call event associated with event icon 512, may present the associated audio or video, or may present user interface controls for accessing the audio or video, when the corresponding event is selected in the timeline interface 502 or list interface 504.

Selected row 570' further includes a list of related events 576. As described in more detail below, the chronology system may identify one or more events related to the selected event. Events may be identified as being related to the selected event, for example, by having common attributes. For example, a selected event may be a telephone call between parties X and Y at a particular date and time, and the related events may be other telephone calls between X and Y at other times. In FIG. 5B, the list of related events 576 includes rows 578a and 578b, each of which contains the attributes of a related event. Event rows 578a and 578b also include buttons 580a and 580b for viewing additional information regarding the respective event, and buttons 582a and 582b for adding the event to the chronology.

In some embodiments, interface 500b may include controls for modifying or customizing the appearance of a selected event icon, as described above. For example, the timeline interface 502 may display controls for annotating the selected event, and may display an annotation for the selected event icon 510'. As a further example, the list interface 552 may display controls for editing the modifiable attributes of a selected event.

Figure 5C:
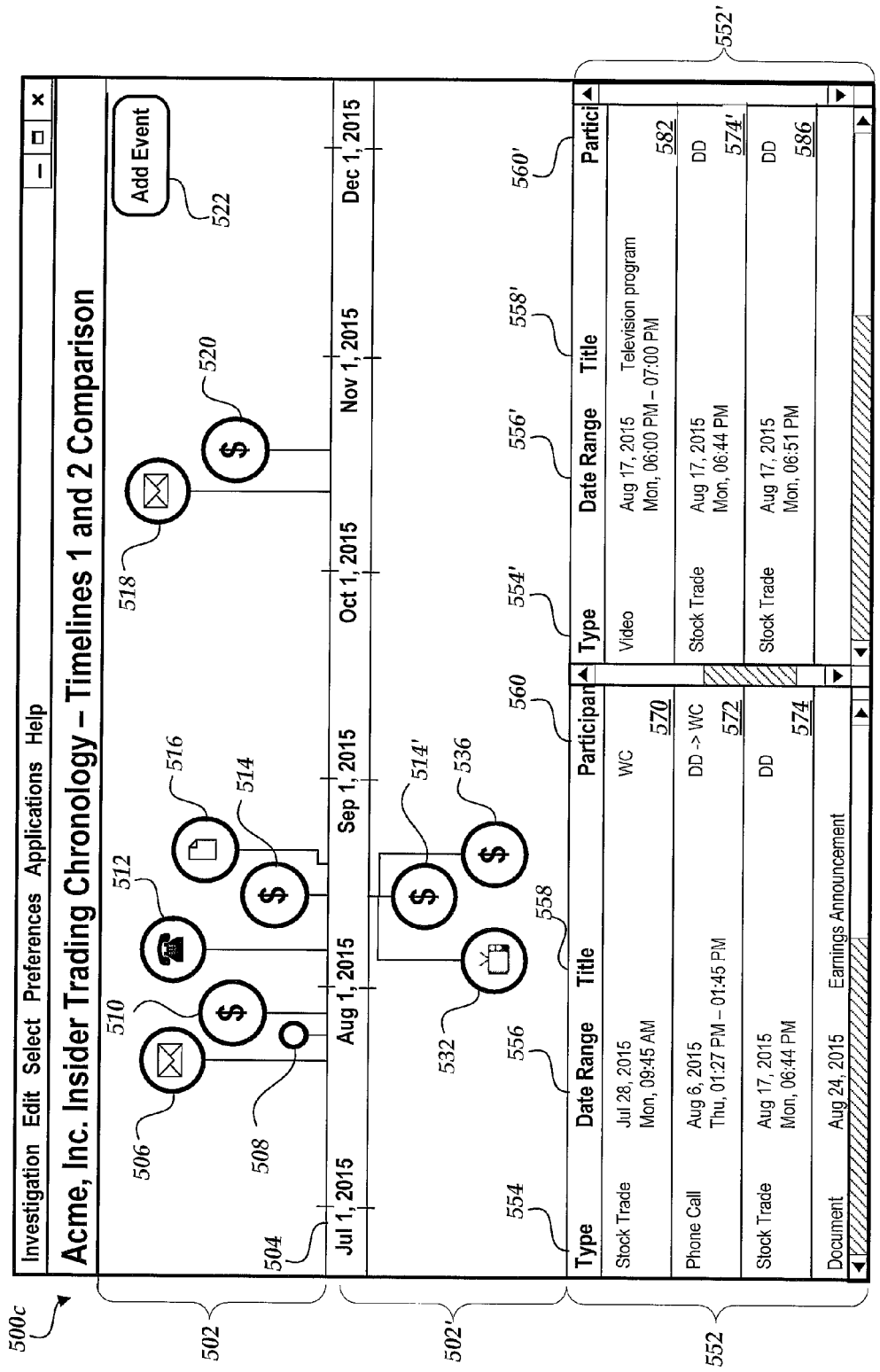

FIG. 5C depicts an example interface 500c for comparing timelines. Interface 500c may be displayed, for example, as a modification or update to interface 500a. Accordingly, only the elements of interface 500c that differ relative to interface 500a will be described.

Interface 500c includes a second timeline interface 502', which displays a second set of event icons 532, 514', and 536 relative to the timeline 504 presented by timeline interface 502. For example, in the embodiment illustrated in FIG. 5C, the first timeline interface 502 is displayed above the timeline 504 and the second timeline interface 502' is displayed below the timeline 504, which is common to both interfaces. In other embodiments (not depicted in FIG. 5C), the second timeline interface 502' may overlap the first timeline interface 502. For example, the second set of event icons 532, 514', and 536 may be displayed using a different color, shape, font, size, style, or otherwise distinguished from the first set of event icons 506-520. In further embodiments, the second timeline interface 502' may include its own timeline 504' rather than sharing a common timeline 504 with the first timeline interface 502.

Event icons 532, 514', and 536 correspond to a second set of events. The second set of events may be relevant to the same investigation or analysis as the first set of events, or in some embodiments may represent an alternative theory of the case. In the embodiment illustrated in FIG. 5C, the first timeline interface 502 includes a series of events suggestive of insider trading, and the second timeline interface 502' presents an alternate set of events that suggest trading based on publicly available information. For example, event icon 532, displaying a "television" symbol, corresponds to a television program airing at the time indicated by its position on the timeline 504. Event icon 514' corresponds to a stock trade that occurred during the airing of the television program, and further corresponds to event icon 514 of the first timeline interface 502. That is, the stock trade associated with event icons 514 and 514' is included in both the first set and the second set of events. Event icon 516 corresponds to a second stock trade during the airing of the television program.

In some embodiments, interface 500c includes a second list interface 552', which includes columns 554'-560' and event rows 582, 574', and 586. Event rows 582, 574' and 586 correspond to the events associated with icons 532, 514', and 516 respectively, and row 574' in the second list interface 552' corresponds to row 574 in the first list interface 552. In other embodiments, a single list interface 552 may include events from both timelines 502 and 502'. Illustratively, a single list interface 552 may display the events of the first timeline 502 distinctly from the events of the second timeline 502', using elements such as colors, icons, fonts, and the like to visually distinguish between the event sets.

Illustratively, interface 500c may be utilized to compare timelines created by different analysts, to assess whether events from a first and second timeline should be combined into a single timeline, to compare two potential timelines of events (e.g., compare two different theories of a case or present counter arguments to a theory), and/or the like. In some embodiments, interface 500c may include controls or other user interface elements to facilitate merging two or more timelines, and may further assign attributes to timeline events based on, for example, the original source or creator of the timeline. For example, interface 500c may generate a merged timeline that highlights each event according to whether the event was originally included in the first timeline, the second timeline, or both timelines.

Figure 5D:
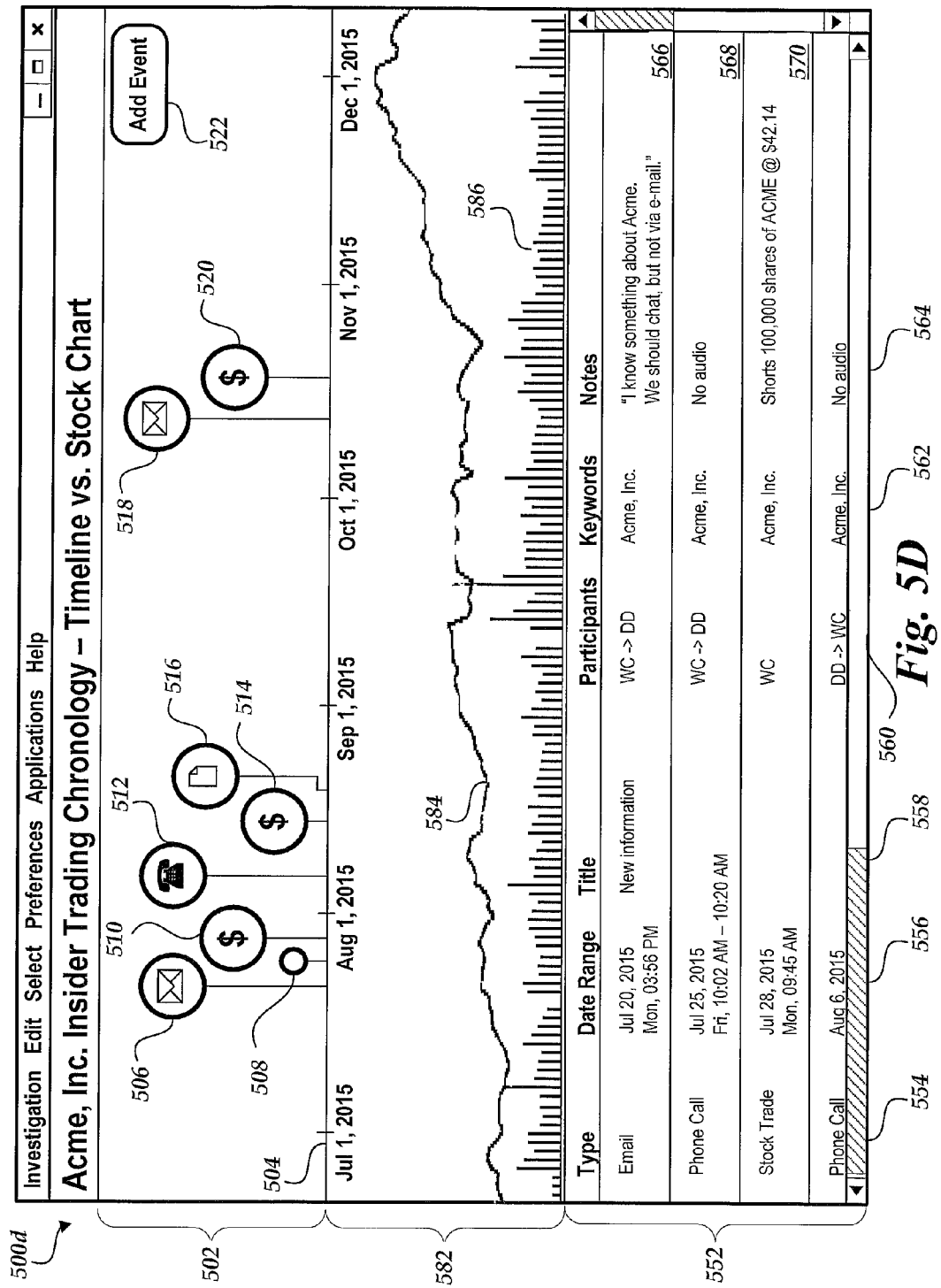

With reference now to FIG. 5D, an example interface 500d for displaying historical data will be described. Interface 500d may be displayed, for example, as a modification or update to interface 500a. Accordingly, only the elements of interface 500d that differ relative to interface 500a will be described.

Interface 500d includes an historical interface 582 for displaying and interacting with historical data—that is, data associated with times displayed on the timeline 504. In the illustrated embodiment, the historical interface 582 displays historical stock prices 584 and trading volumes 586 for Acme, Inc. stock, which is the stock that was traded in events 510, 514, and 520. As other, non-limiting examples, the historical interface 582 may display data such as health statistics, account balances, sales volumes, or other data that varies over time and in relation to the set of relevant events.

In some embodiments, selection of an event in the timeline interface 502 or list interface 552 may cause an update to the historical interface 582. For example, selecting event icon 516 may highlight trading volumes or stock prices on the associated date. Selection of a particular date in the historical interface 582 may further cause display of an event selection interface, as described above with reference to FIG. 5B, that displays events within an interval of the selected date and time, and that provides controls for viewing these events or for adding these events to the set of relevant events.

Figure 5E:
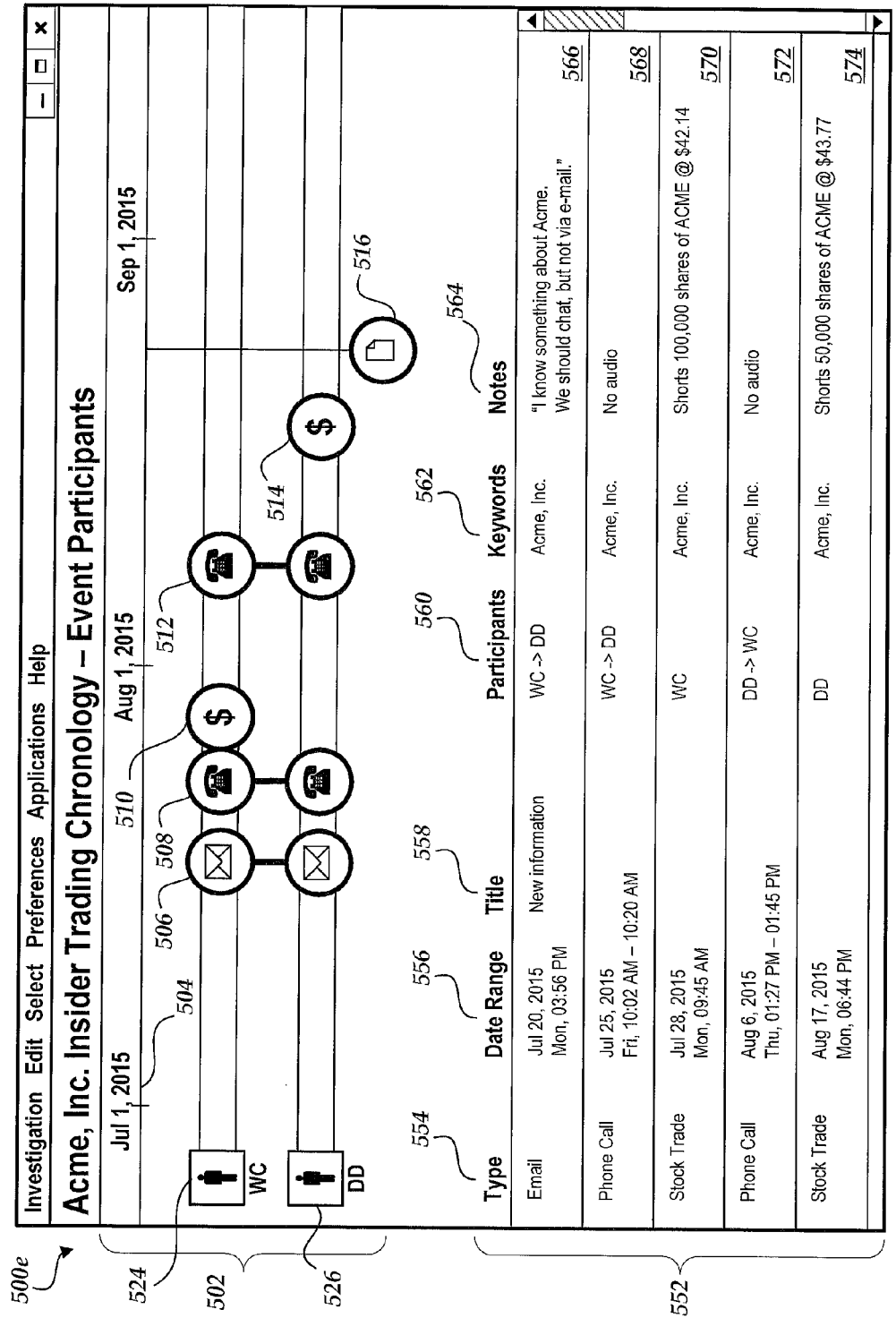

FIG. 5E depicts an example interface 500e for displaying event participant Stimelines. Interface 500e may be displayed, for example, as a variation or alternative to interface 500a. Accordingly, only the elements of interface 500e that differ relative to interface 500a will be described.

Interface 500e includes participant timelines 524 and 526 within its timeline interface 502. Participant timeline 524 includes event icons 506, 508, 510, 512, all of which correspond to events that include "WC" as a participant. Participant timeline 526 includes event icons 506, 508, 512, and 514, all of which correspond to events that include "DD" as a participant. Events having multiple participants, such as the telephone call corresponding to event icon 508, display a connection between the participants. The timeline 504 further includes event 516, which does not have any participants and accordingly is not included on either of the participant timelines 524 and 526.

Interface 500e may display more or fewer participant timelines within the scope of the present disclosure. For example, interface 500e may display three participant timelines and include events with three participants, or may display a single participant timeline in response to, e.g., input selecting the participant. In some embodiments, participants may be added or removed from the timeline interface 502 based on received inputs. As a non-limiting example, the interface 500e may display a single participant timeline for X, which includes an email exchange between X, Y and Z. Selecting the email event may thus cause generation and/or display of participant timelines for Y and Z.

FIG. 5F depicts an example interface 500f that combines elements of the timeline interface 502 and the list interface 552. The timeline 504 of FIG. 5F is displayed vertically as a calendar rather than horizontally as a line, and entries in the list interface 552 are spaced according to their positions in the calendar. In some embodiments, the timeline interface of FIG. 502 may be interactive, such that "zooming in" on the calendar may cause display of a shorter time interval and allow, e.g., viewing of timelines at the daily or hourly level.

Chronology user interfaces 500a-f are non-limiting examples, and the present disclosure encompasses further variations that are not illustrated in the drawings. As an example, a timeline interface 502 may display a different set of events than the associated list interface 552, or one interface may display a subset of the events displayed in the other interface. As a further example, events corresponding to a date or time range may be displayed as blocks or ranges within the timeline interface. Further, various features of the various user interfaces 500a-f described above may be combined in various ways.

In various embodiments, one or more of the user interfaces 500a-f described above may include various additional features.

In some embodiments, events (as displayed in the example user interfaces described above) may be stored in an optimized database and/or table, which may be separate from the database 209, for example. For example, when a data object is added to a timeline/list of a chronology user interface, certain properties/attributes associated with that data object may be extracted and stored in the optimized database in association with the event that is added to the user interface. Advantageously, some properties associated with a data object may not be relevant to the display of the event in a chronology user interface, and thus may not be stored in the optimized database. Thus, when the chronology user interface is generated based on events stored in the optimized database, fewer properties of the events may need to be read (speeding up accessing and processing time), and the stored information may be less than with the full data objects were stored.

In some implementations, such events stored in an optimized database may include links back to the respective data objects. Thus, via a chronology user interface (such as one or more of the user interfaces 500a-f), the user may select to view the data object associated with the event, and the system may link to the data object by automatically executing an application associated with the data object (e.g., generate a user interface similar to the user interface of FIG. 4). In various implementations, the user may manually link an event to a data object, the user may manually enter an event (including its associated properties/attributes), the user may manually cause an event to be added via selection of a data object, the system many automatically add events associated with data objects, and/or the like.

In some implementations, multiple users may collaborate with one another via chronology user interfaces. For example, two users, via two different computing devices, may view a same chronology, and/or events associated with a same chronology. Either user may, for example, reorder or edit events and/or properties associated with events (e.g., a user may add comments or keywords to, or otherwise annotate, an event). In response the system may automatically propagate those changes to the user interface of the other user, such that the events viewed by either collaborating user may be updated automatically.

In some implementations, access to a chronology may be controlled. For example, a password may be required to access the chronology, or an access control list (ACL) may be used. An ACL is a set of one or more permissions that govern use (e.g., read access, write access, etc.) of the associated chronologies, or that govern use of individual rows or events within a chronology. For example, a permission may specify a set of one or more trustees (e.g., a user) and one or more use rights (e.g., read access, write access, etc.) of those trustees with respect to the associated chronology. As another example, a permission may specify a minimum security classification level (e.g., unclassified, secret, top secret, or a particular job title or position) such that only users that possess the minimum security classification level can use (e.g., read, write, etc.) rows or events in a chronology that involve a particular subject or that originate from a particular source.

In some implementations, the user interfaces may include one or more search user interface elements or search user interfaces by which the user may search or filter events (e.g., using keywords). For example, the user may specify certain terms, and any event that is associated with that term (e.g., includes the term in an annotation or other property) may be displayed to the user in a results list, or the user interface may be updated to only display events (in the list and/or timeline) that are associated with that term.

In some implementations, events displayed in a user interface may be linked to an original source (e.g., a source of the information associated with the event, a data object associated with the event, etc.) such that any changes to that original source may be automatically updated and reflected in the user interface. For example, new information may become available indicating a change to a time or date associated with an event. Accordingly, the system may determine that this change has been made, and automatically update the user interface to indicate the change. For example, the event may move on the timeline, or the list may be reordered. The user may be notified of the change via an indication in the user interface, and/or an alert may be sent to the user, as described below.

Additional examples of user interfaces and user interface features, and system for generating user interfaces, as described herein, may be found in U.S. patent application Ser. No. 14/841,338, filed Aug. 31, 2015, and titled "SYSTEM FOR PROVIDING DYNAMIC LINKED PANELS IN USER INTERFACE," the entire disclosure of which is hereby made part of this specification as if set forth fully herein and incorporated by reference for all purposes, for all that it contains.

Further examples of user interfaces and user interface features, and systems for generating user interfaces with timelines and linking data objects may be found in U.S. patent application Ser. No. 14/670,089, filed Mar. 26, 2015, and titled "TEMPORAL REPRESENTATION OF STRUCTURED INFORMATION IN AN OBJECT MODEL," the entire disclosure of which is hereby made part of this specification as if set forth fully herein and incorporated by reference for all purposes, for all that it contains.

Additional examples of Access Control Lists and ACL features, and systems for generating ACLs as described herein, may be found in U.S. Pat. No. 8,527,461 entitled "CROSS-ACL MULTI-MASTER REPLICATION" filed Nov. 27, 2012, U.S. Pat. No. 8,688,749 entitled "CROSS-ONTOLOGY MULTI-MASTER REPLICATION" filed Mar. 31, 2011, U.S. Pat. No. 9,081,975 entitled "SHARING INFORMATION BETWEEN NEXUSES THAT USE DIFFERENT CLASSIFICATION SCHEMES FOR INFORMATION ACCESS CONTROL" filed Oct. 22, 2012, and U.S. Pat. No. 8,838,538 entitled "TECHNIQUES FOR REPLICATING CHANGES TO ACCESS CONTROL LISTS ON INVESTIGATIVE ANALYSIS DATA" filed Jul. 31, 2013, the entire disclosure of each of which is hereby made part of this specification as if set forth fully herein and incorporated by reference for all purposes, for all that it contains.

Additional examples of user interfaces and user interface features, similar to those described herein, may be found in Appendix A of U.S. Provisional Application No. 62/272,526, the entire disclosure of which is hereby made part of this specification as if set forth fully herein and incorporated by reference for all purposes, for all that it contains.

In reference to Appendix A of U.S. Provisional Application No. 62/272,526, pages 2-12 illustrate examples of alternative designs of user interfaces similar to those described above. Pages 13-17 illustrate examples of alternative user interface designs and/or exported documents (e.g., exports of the chronology user interfaces) similar to the user interfaces described above. Pages 18-110 illustrate additional examples of alternative designs and functionality of user interfaces similar to those described above.

Example Methods/Routines

Figure 6:
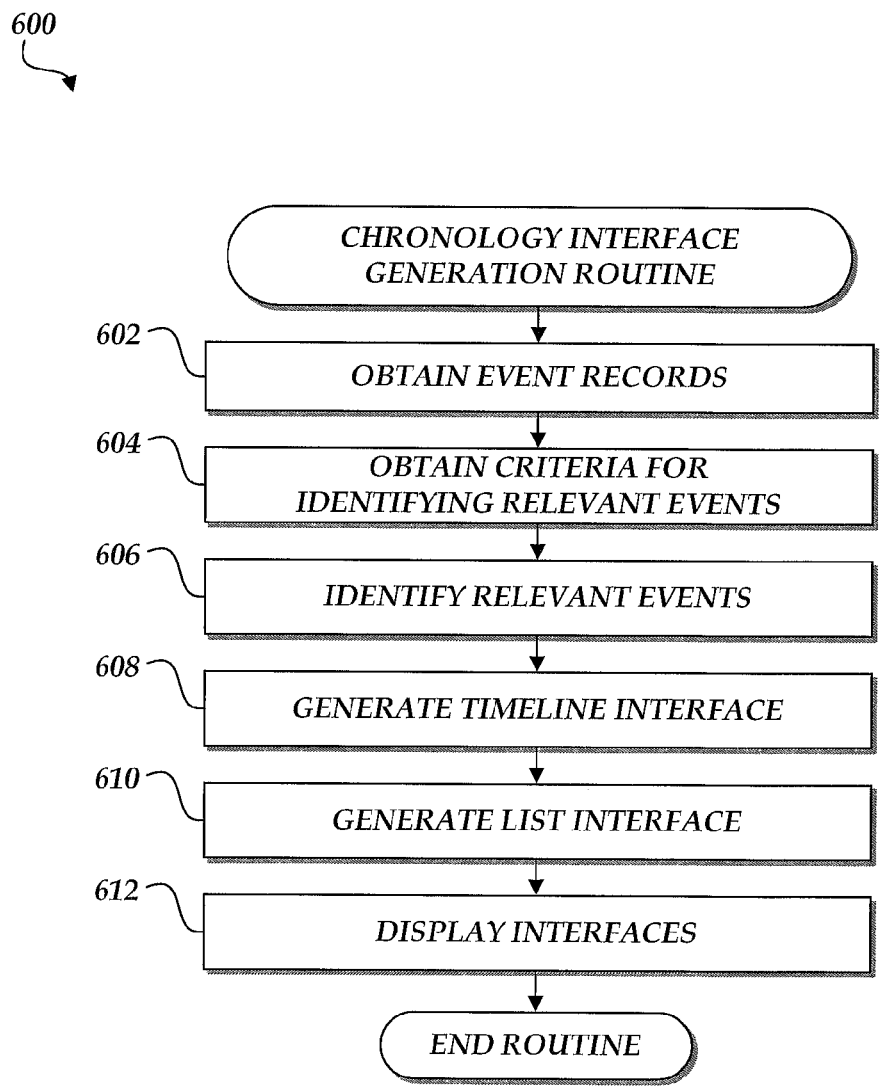
FIG. 6 is a flow diagram depicting an example routine for generating a chronology user interface in accordance with aspects of the present disclosure.

With reference now to FIG. 6, an example routine 600 for generation of a chronological interface will be described. At block 602, a set of events may be obtained. The set of events may illustratively include thousands or millions of events, only a portion of which may be relevant to an investigation or analysis. For example, the set of events may include all stock trades carried out within a particular timeframe, a log of all email messages sent or received, and so forth. Events may illustratively be obtained from a data store, such as the database 209 described above with reference to FIG. 2, and may correspond to data objects of a particular type (e.g., an "event" type) defined in an ontology 205. In some embodiments, a link may be maintained between the obtained events and their representations in the database 209. In other embodiments, one or more events may be obtained based on input data, and may further be linked to corresponding data objects in the database 209.

At block 604, criteria may be obtained for identifying a set of relevant events within the larger set of events. For example, the criteria may specify financial transactions involving certain participants, emails that include certain keywords, events on or about a particular date, or various other criteria. In some embodiments, the criteria may be inputs indicating selection of events. For example, the criteria may be a series of drag-and-drop inputs or other inputs indicating that an event should be added to the timeline. At block 606, a set of relevant events may be identified based on the criteria obtained at block 604.

At block 608, a timeline interface, such as the timeline interface 502 as described above, may be generated for display. Illustratively, the set of relevant events obtained at block 606 may be organized into a timeline according to their date and time attributes, and may be displayed as icons or symbols on the timeline as described above. At block 610 a list interface, such as the list interface 552, may be generated for display. One skilled in the art will appreciate that blocks 608 and 610 may be carried out independently of each other, and that the blocks may be carried out in parallel or in any order. At block 612, the timeline and list interfaces may be displayed.

In some embodiments, blocks 604-612 may be carried out repeatedly to generate updated timeline interfaces and list interfaces, or to generate additional timeline interfaces and list interfaces for display, as described above with reference to FIGS. 5B and 5C.

Figure 7:
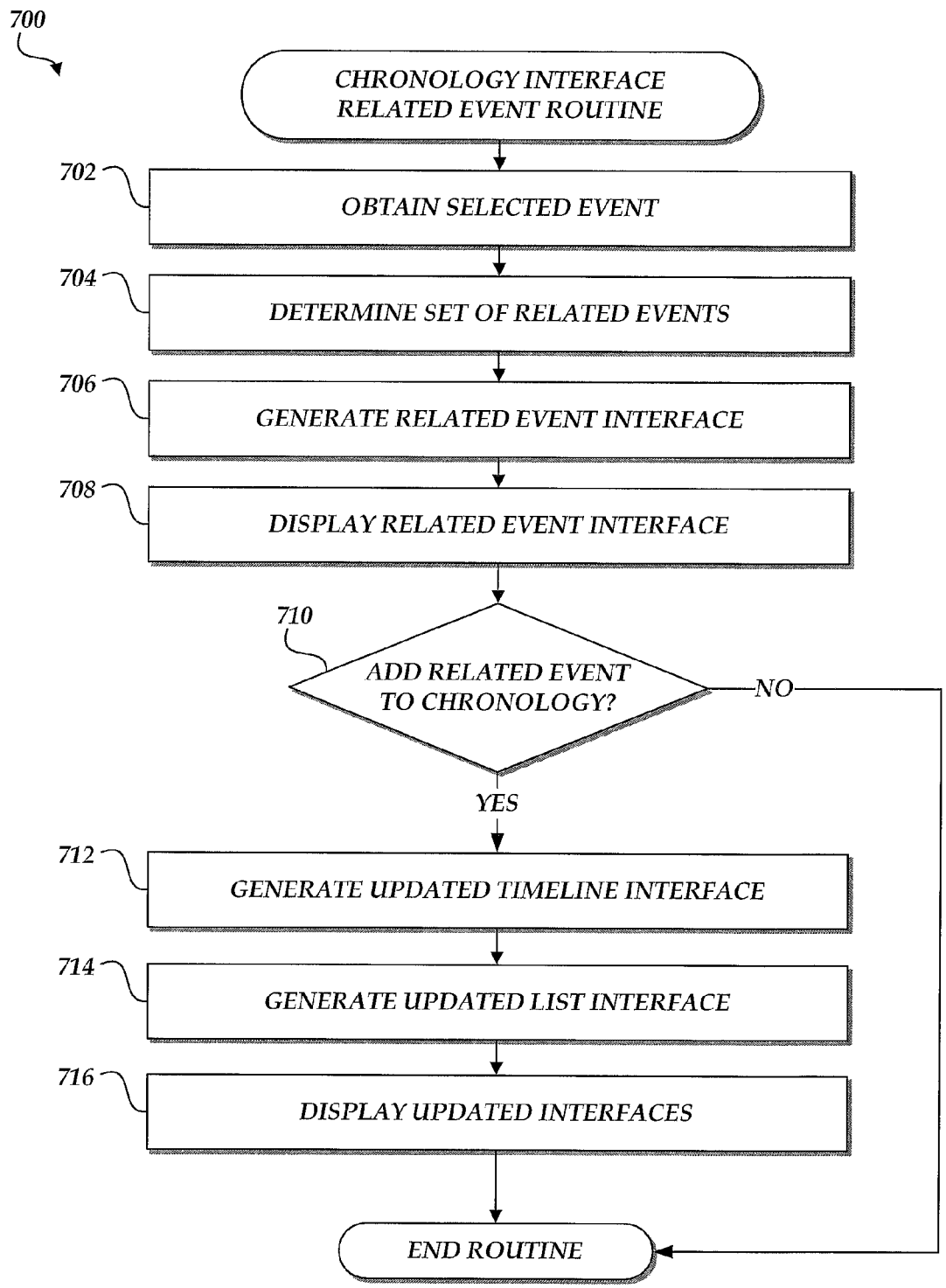
FIG. 7 is a flow diagram depicting an example routing for identifying events related to the chronology and presenting an updated user interface in accordance with aspects of the present disclosure.

With reference now to FIG. 7, an example routine 700 for processing related events will be described. At block 702, an event may be obtained. For example, an event may be obtained based on input indicating a selection in the timeline interface 502 or the list interface 552.

At block 704, a set of related events may be determined. Illustratively, the set of related events may be determined based on further input, such as a request to display other telephone calls made within a specified timeframe of a selected telephone call event. In some embodiments, the set of related events may be determined automatically. For example, the set of relevant events may be analyzed to determine the relevance of a particular selected event, based on attributes or other criteria that the relevant events have in common. Events may be identified as potentially related if they are tagged with a certain keyword (such as "Acme, Inc." in the examples above), involve certain participants, or occur relatively closely in time to events in the set of relevant events. The analysis may further consider key events in the timeline as indications of greater relevance. For example, stock trades that occur just before an earnings report may be identified as potentially related to the set of relevant events. In some embodiments, machine learning may be used to refine the automatic identification of related events based on previous manual selections of related events. For example, weighting factors may be applied to bias identification of related events in favor of events similar to those selected for inclusion in the timeline and list interfaces. In some embodiments, the identified events may be assigned a score or grade indicating a predicted likelihood of being related to the set of relevant events.

At block 706, a related event interface may be generated for display, as described above with reference to FIG. 5B. At block 708, the related event interface may be displayed.

Thereafter, at decision block 710, a determination may be made that one or more of the related events should be added to the set of relevant events. Illustratively, the determination may be made based on input selecting a related event for addition to the timeline, on scores or grades assigned to the related events, or based on other criteria. If the determination is that no related events should be added to the set, the routine 700 ends. Otherwise, the routine 700 branches to block 712, where an updated timeline interface may be generated that includes the newly added relevant event. At block 714, which may precede, follow, or be carried out in parallel with block 712, a list interface may be generated that includes the new relevant event. At block 716, the updated interfaces may be displayed, and thereafter the routine ends. In some embodiments, blocks 704-716 may be carried out iteratively to update the list of related events after a modification to the set of relevant events.

In some embodiments, an alert and/or notification may be automatically generated when data objects are updated, in response to changes to one or more events, in response to various changes in user interfaces, and/or the like, and the alert may be transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a chronology application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the chronology system so that the entity can log in to the chronology system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet. Alerts may include, for example, notifications to a user regarding a change to an event (e.g., by another user that is collaborating with the user), notifications to a user regarding new data objects that represent events related to events in a chronology, and/or the like.

Additional Embodiments

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as example only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the example methods or processes disclosed herein. Further, the inventions illustratively disclosed herein suitably may be practiced in the absence of any element or aspect which is not specifically disclosed herein, such as without.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. For example, a general purpose computer comprising one or more processors should not be interpreted as excluding other computer components, and may possibly include such components as memory, input/output devices, and/or network interfaces, among others. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
   a data store configured to store computer-executable instructions; and
   a processor, wherein the computer-executable instructions, when executed, configure the processor to:
      obtain a plurality of events, each of the plurality of events comprising event attributes, the event attributes comprising at least an event timestamp;
      obtain one or more criteria associated with event attributes;
      determine, based at least in part on the one or more criteria, a set of relevant events within the plurality of events;
      determine, based at least in part on the one or more criteria, that one or more events within the set of relevant events are key events;
      generate for display a user interface based at least in part on the set of relevant events and the corresponding event attributes, the user interface comprising:
         a timeline interface for display of a timeline, wherein positions of individual relevant events within the timeline interface are determined based at least in part on respective event timestamps, and wherein the timeline interface displays the one or more events as key events;
            wherein the timeline is displayed as a horizontal line and time increments displayed in short vertical or hash indications intersecting the horizontal line,
            wherein key events are displayed as icons offset from the horizontal line and connected to the line by vertical lines intersecting the horizontal line at a position corresponding to the timestamps and at a position corresponding proportionally to the time increments;
            wherein the key event icons comprise indications of event type;
         a list interface for display of the set of relevant events, wherein the list interface is displayed in rows and columns with a single row corresponding to a single one of the plurality of events, and wherein additional information corresponding to the event is displayed in columns;
      cause display of the user interface; and
      display, in response to a user selection of an event icon, a highlighted row corresponding to an event and comprising related events not displayed on the timeline, wherein each related event is separate from the highlighted event and has a different timestamp as the highlighted event, and wherein the related event is determined to be related based on having one or more event attributes in common with the highlighted event.

2. The system of claim 1, wherein the event attributes further comprise at least one of an event source, an event type, an event icon, an event duration, an event title, a set of event participants, a set of event keywords, and a set of event annotations.

3. The system of claim 1, wherein the processor is further configured to:
   obtain input identifying a selected event displayed within the user interface;
   generate for display a first update to the user interface, the first update comprising:
      an indication of selection of the selected event within the timeline interface; and
      an indication of selection of the selected event within the list interface; and
   cause display of the first update to the user interface.

4. The system of claim 1, wherein the processor is further configured to:
   determine that at least one of the plurality of events has been updated;
   generate an alert indicating that the at least one of the plurality of events has been updated; and
   cause transmission of the alert to a computing device, wherein transmission of the alert causes the computing device to activate an application for display of the alert, and wherein the alert enables display of an updated user interface, the updated user interface based at least in part on an updated event of the plurality of events.

5. The system of claim 3, wherein the processor is further configured to:
   determine, based at least in part on the selected event, one or more related events from within the plurality of events;
   generate for display an event selection interface for display of the one or more related events; and
   cause display of the event selection interface.

6. The system of claim 5, wherein the processor configured to determine the one or more related events is configured to determine the one or more related events based at least in part on one or more attributes of the selected event.

7. The system of claim 5, wherein the processor is further configured to:

obtain input identifying a related event within the one or more related events, the input indicating that the related event should be added to the set of relevant events;

generate for display a second update to the user interface, the second update comprising:

display of the related event within the timeline interface; and display of the related event within the list interface; and cause display of the second update to the user interface.

8. A computer-implemented method comprising:

obtaining a plurality of events, each of the plurality of events comprising event attributes;

determining, based at least in part on one or more criteria associated with event attributes, a set of relevant events within the plurality of events;

determining, based at least in part on the one or more criteria associated with event attributes, that a subset of the set of relevant events are key events;

generating for display a user interface based at least in part on the set of relevant events, the user interface comprising:

a timeline interface for display of a timeline, wherein positions of individual relevant events within the timeline interface are determined based at least in part on respective event attributes, wherein the timeline interface displays the subset of the set of relevant events as key events, wherein the timeline is displayed as a horizontal line and time increments displayed in short vertical or hash indications intersecting the horizontal line, wherein key events are displayed as icons offset from the horizontal line and connected to the line by vertical lines at a position corresponding to event timestamps and to the time increments, and wherein the key event icons comprise indications of event type; and a list interface for display of the set of relevant events, wherein the list interface is displayed in a table with a designated portion of the table corresponding to a single one of the plurality of events, and wherein additional information corresponding to the event is displayed in the table and not displayed on the timeline;

displaying the user interface; and displaying, in response to a user selection of an event icon, a highlighted row corresponding to an event and comprising related events not displayed on the timeline, wherein each related event is separate from the highlighted event and has a different timestamp as the highlighted event, and wherein the related event is determined to be related based on having one or more event attributes in common with the highlighted event.

9. The computer-implemented method of claim 8, wherein the event attributes include at least one configurable attribute.

10. The computer-implemented method of claim 9, wherein the at least one configurable attribute comprises an event annotation, an event icon, an event description, or an event keyword.

11. The computer-implemented method of claim 9 further comprising:

obtaining an input indicative of a modification of a configurable attribute for a relevant event;

modifying the configurable attribute for the relevant event;

generating for display a first update to the user interface, the first update comprising at least one of a modified configurable attribute within the timeline interface and a modified configurable attribute within the list interface; and causing display of the first update to the user interface.

12. The computer-implemented method of claim 8 further comprising:

obtaining one or more updates to the plurality of events;

determining, based at least in part on the one or more updates, an update to the set of relevant events;

generating for display an alert message, the alert message indicating the update to the set of relevant events; and displaying the alert message.

13. The computer-implemented method of claim 12 further comprising:

generating for display an updated user interface based at least in part on the update to the set of relevant events, the updated user interface comprising an updated timeline interface and an updated list interface; and displaying the updated user interface.

14. A non-transitory computer-readable storage medium including computer-executable instructions that, when executed by a processor, cause the processor to:

determine, based at least in part on a first set of criteria, a first set of relevant events within a plurality of events;

determine, based at least in part on the first set of criteria, that a first subset of the first set of relevant events are key events;

generate a first timeline corresponding to the first set of relevant events;

generate for display a first user interface based at least in part on the first set of relevant events, the first user interface comprising:

a timeline interface for display of at least a portion of the first timeline, wherein individual relevant events are positioned within the timeline interface based at least in part on respective attributes of the individual relevant events, wherein the timeline interface displays the first subset as key events, wherein the timeline is displayed as a horizontal line with time increments indicated on the horizontal line, wherein events are displayed as icons offset from the horizontal line and connected to the horizontal line by other lines intersecting the horizontal line at a position corresponding to event timestamps and to the time increments, and wherein the event icons comprise indications of event type; and a list interface for display of at least the portion of the first set of relevant events, wherein the list interface is displayed in rows with a single row corresponding to a single one of the plurality of events, and wherein additional information not displayed on the timeline corresponding to the event is displayed in the row;

cause display of the first user interface; and display, in response to a user selection of an event icon, a highlighted row corresponding to an event and comprising related events not displayed on the timeline, wherein each related event is separate from the highlighted event and has a different timestamp as the highlighted event, and wherein the related event is determined to be related based on having one or more event attributes in common with the highlighted event.

15. The non-transitory computer-readable medium of claim 14, wherein the first set of criteria is associated with event attributes, and wherein the first set of relevant events comprises events that satisfy the first set of criteria.

16. The non-transitory computer-readable medium of claim 14, wherein the computer-executable instructions further cause the processor to:
   determine, based at least in part on a second set of criteria, a second set of relevant events within the plurality of events;
   determine, based at least in part on the second set of criteria, that a second subset of the second set of relevant events are key events;
   generate a second timeline corresponding to the second set of events;
   generate for display a second user interface based at least in part on the second set of relevant events; and
   cause display of the second user interface.

17. The non-transitory computer-readable medium of claim 16, wherein the first set of relevant events and the second set of relevant events have at least one event in common.

18. The non-transitory computer-readable medium of claim 16, wherein the second user interface comprises:
   a combined timeline interface for display of a combined timeline, the combined timeline comprising the first timeline and at least a portion of the second timeline;
   a first list interface for display of the first set of relevant events; and
   a second list interface for display of the second set of relevant events.

19. The non-transitory computer-readable medium of claim 18, wherein the computer-executable instructions further cause the processor to generate the combined timeline based at least in part on the first timeline and the second timeline.

20. The non-transitory computer-readable medium of claim 18, wherein the second user interface further comprises:
   at least a portion of the first set of relevant events positioned above the combined timeline; and
   at least a portion of the second set of relevant events positioned below the combined timeline.

* * * * *